US012162093B2

United States Patent
Heinrici et al.

(10) Patent No.: US 12,162,093 B2
(45) Date of Patent: Dec. 10, 2024

(54) HIGH LEVERAGE BEAM WOBBLING

(71) Applicant: II-VI DELAWARE, INC., Wilmington, DE (US)

(72) Inventors: Axel Heinrici, Kleinmachnow (DE); Paul Sonntag, Berlin (DE); Patrick Kühl, Berlin (DE); Rutger Wevers, Berlin (DE)

(73) Assignee: II-VI DELAWARE, INC., Wilmington, DE (US)

( * ) Notice: Subject to any disclaimer, the term of this patent is extended or adjusted under 35 U.S.C. 154(b) by 135 days.

(21) Appl. No.: 17/001,920

(22) Filed: Aug. 25, 2020

(65) Prior Publication Data

US 2022/0063020 A1  Mar. 3, 2022

(51) Int. Cl.
*B23K 26/24* (2014.01)
*B23K 26/06* (2014.01)
(Continued)

(52) U.S. Cl.
CPC .......... *B23K 26/24* (2013.01); *B23K 26/0648* (2013.01); *B23K 26/073* (2013.01);
(Continued)

(58) Field of Classification Search
CPC ...... B23K 26/00; B23K 26/24; B23K 26/082; B23K 26/0648; B23K 26/073;
(Continued)

(56) References Cited

U.S. PATENT DOCUMENTS 5,877,494 A   3/1999  Larsen et al.
5,923,473 A * 7/1999  Kelley ................ H04N 1/0408
                                              359/823
(Continued)

FOREIGN PATENT DOCUMENTS

DE   112007001944 A5   5/2009
DE   102011117607 A1   5/2013
(Continued)

OTHER PUBLICATIONS

Burge, et al., An Easy Way to Relate Optical Element Motion to System Pointing Stability, Current Developments in Lens Design and Optical Engineering VII, Proc. SPIE, 2006, 6288, 12 pages.
(Continued)

*Primary Examiner* — Nathaniel E Wiehe
*Assistant Examiner* — Alba T Rosario-Aponte
(74) *Attorney, Agent, or Firm* — Blank Rome LLP

(57) ABSTRACT

In one example, system includes a source for providing a laser beam and a collimator including a plurality of lenses positioned along a beam path of the laser beam. At least one lens of the plurality of the lenses is transversely movable relative to the laser beam path to induce angular movement or deflection of the laser beam. The collimator is positioned in the beam path and is structured such that the laser beam at the at least one lens has a reduced diameter relative to the diameter of the laser beam exiting the collimator. The systems disclosed herein may be used in connection with systems for laser cutting a component, laser machining a component, or laser welding or otherwise joining two or more components with a laser, amongst other variations.

19 Claims, 3 Drawing Sheets

(51) Int. Cl.
*B23K 26/073* (2006.01)
*B23K 26/082* (2014.01)
*G02B 26/08* (2006.01)
*G02B 27/30* (2006.01)
*H02K 41/035* (2006.01)
*H02N 2/02* (2006.01)

(52) U.S. Cl.
CPC ........ *B23K 26/082* (2015.10); *G02B 26/0875* (2013.01); *G02B 27/30* (2013.01); *H02K 41/0356* (2013.01); *H02N 2/026* (2013.01)

(58) Field of Classification Search
CPC .. B23K 26/0876; B23K 26/06; B23K 26/046; B23K 26/042; B23K 26/032; B23K 26/035
USPC .............. 219/121.8, 121.79, 121.78, 121.75, 219/121.73, 121.61, 121.6, 121.63, 219/121.64
See application file for complete search history.

(56) References Cited

U.S. PATENT DOCUMENTS

| | | | |
|---|---|---|---|
| 7,408,687 B2 | 8/2008 | Lizotte | |
| 9,261,702 B2 | 2/2016 | Chan | |
| 2007/0091411 A1* | 4/2007 | Mori | G02F 1/37 359/239 |
| 2008/0019702 A1* | 1/2008 | Shibatani | G02B 6/4225 398/182 |
| 2010/0296184 A1* | 11/2010 | Shibatani | G02B 7/005 310/317 |
| 2012/0092740 A1* | 4/2012 | Kimura | G02B 26/127 359/204.1 |
| 2012/0320347 A1* | 12/2012 | Morikuni | G02B 13/12 353/101 |
| 2015/0135703 A1* | 5/2015 | Eddington | G03B 5/00 60/528 |
| 2016/0228988 A1* | 8/2016 | Dallarosa | B23K 26/144 |
| 2017/0192168 A1* | 7/2017 | Grobnic | G02B 6/34 |
| 2019/0384183 A1* | 12/2019 | Yang | G03F 7/706 |
| 2020/0376594 A1 | 12/2020 | Grapov et al. | |
| 2021/0162539 A1 | 6/2021 | Kayahara et al. | |

FOREIGN PATENT DOCUMENTS

| | | |
|---|---|---|
| DE | 102012108214 A1 | 3/2014 |
| DE | 102013102442 A1 | 9/2014 |
| DE | 102014210119 A1 | 12/2015 |
| DE | 102019108084 A1 | 10/2019 |
| EP | 0723834 A1 | 7/1996 |
| WO | WO-03023521 A1 | 3/2003 |
| WO | WO-2008019681 A1 | 2/2008 |
| WO | WO-2020050379 A1 | 3/2020 |
| WO | WO-2020115110 A1 | 6/2020 |

OTHER PUBLICATIONS

"Zoom Fiber Collimators. Technical Data Sheet, Thorlabs URL: https://www.thorlabs.com/newgrouppage9.cfm?objectgroup_id=8642 [abgerufen am Aug. 8, 2024]".

* cited by examiner

HIGH LEVERAGE BEAM WOBBLING

FIELD

The present disclosure generally relates to optical systems and related techniques for use of the same. More particularly, but not exclusively, the present disclosure relates to systems and methods for inducing wobbling into a laser beam.

BACKGROUND

Unless otherwise indicated herein, the materials described herein are not prior art to the claims in the present application and are not admitted to be prior art by inclusion in this section.

In certain applications in which laser beams are used, it may be desirable to move the laser beam relative to an article onto which the laser beam is directed. These applications may include laser cutting a component, laser machining a component, or laser welding or otherwise joining two or more components with a laser, amongst other variations. By way of example, the laser beam may be moved relative to the article so that the laser beam may contact more surface area of the article than instances in which the laser beam is not moved relative to the article. In one form, the movement of the laser beam may be accomplished by inducing a wobble to the laser beam such that the laser beam contacting the article is oscillated and creates a wider track width as the laser beam is moved along the article relative to forms in which the laser beam is moved along the article without wobbling the laser beam. Stated alternatively, the track width when the laser beam is oscillated is wider than the laser beam itself in the absence wobbling. In laser cutting applications, scanning in and perpendicular to the feed direction may also be used.

In laser welding processes for example, a fast movement on top of the normal movement of the laser beam relative to the articles or components being joined may be desired. For example, the laser beam as directed on the seam between the components may have a diameter 0.2 to 0.3 mm diameter without wobbling. However, the laser beam may be oscillated at a frequency of 200 to 500 Hz transverse to the feed direction in such a way that a track width of 0.6 to 1 mm is created. In these processes, wobbling of the laser beam creates a wider track width which reduces spattering, facilitates bridging gaps, and allows slower welding speeds which, in turn, may allow greater welding depths using moderate laser power.

In certain systems, a scanner determines a weld path along the seam between one or more articles or components to be joined, and controls movement of a laser beam along the weld path. The scanner may implement beam wobbling by generating a superimposed wobble pattern when determining the motion path of the laser that follows the seam geometry. However, using the scanner to generate the wobbling superimposes the wobble onto the sensor beam path, and this may influence sensors used in these systems and affect accuracy of the weld path determined by the scanner. Beam wobbling may also be achieved using a fast oscillating deflecting mirror, although this may result in extension of the beam path and may be rather expensive to implement. Movement of a lens in an optical system has also been proposed for creating a wobble in a laser beam. However, for movement of the lens necessary to achieve the amplitude of typical wobble patterns, high accelerations associated with movement of the lens which may impose significant vibration recoil on the optical system have been encountered.

The subject matter claimed herein is not limited to implementations that solve any disadvantages or that operate only in environments such as those described above. Rather, this background is only provided to illustrate one example technology area where some implementations described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

In one example embodiment, a system includes a source for providing a laser beam and a collimator including a plurality of lenses positioned along a beam path of the laser beam. At least one lens of the plurality of lenses is transversely movable relative to the beam path to induce angular movement or deflection of the laser beam. The collimator is positioned in the beam path and is structured such that the laser beam at the at least one lens has a reduced diameter relative to the diameter of the laser beam exiting the collimator.

In another example embodiment, a system includes a source for providing a laser beam and a collimator including a plurality of lenses positioned along a beam path of the laser beam. The plurality of lenses includes one or more movable lenses transversely movable relative to the beam path to induce angular movement or deflection of the laser beam. Each of the one or more movable lenses includes a refractive power which is greater than the refractive power of the other lenses of the plurality of lenses of the collimator.

In still another example embodiment a method includes passing a laser beam through a collimator; providing the laser beam at a movable lens of the collimator transversely movable relative to a beam path of the laser beam with a reduced diameter relative to the diameter of the laser beam exiting the collimator; and moving the movable lens of the collimator along a first axis extending transversely to the beam path of the laser beam to induce angular movement or deflection of the laser beam.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict one non-limiting typical embodiment of the invention and are therefore not to be considered limiting of its scope. The invention will be described and explained with additional specificity and detail through the use of the accompanying drawings in which.

DETAILED DESCRIPTION

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

The present disclosure generally relates to optical systems and related techniques for use of the same. More particularly, but not exclusively, the present disclosure relates to systems and methods for inducing wobbling into a laser beam. In one aspect, the optical systems disclosed herein may be used in connection with laser cutting a component, laser machining a component, additive manufacturing, or laser welding or otherwise joining two or more components with a laser, amongst other variations. Although the embodiments are described in the context of laser beam wobbling which may be used in these processes, it will be appreciated that embodiments disclosed herein may be employed in other fields and/or operating environments where the functionality disclosed herein may be useful. Accordingly, the scope of the invention should not be construed to be limited to the exemplary implementations and operating environments disclosed herein.

Figure 1:
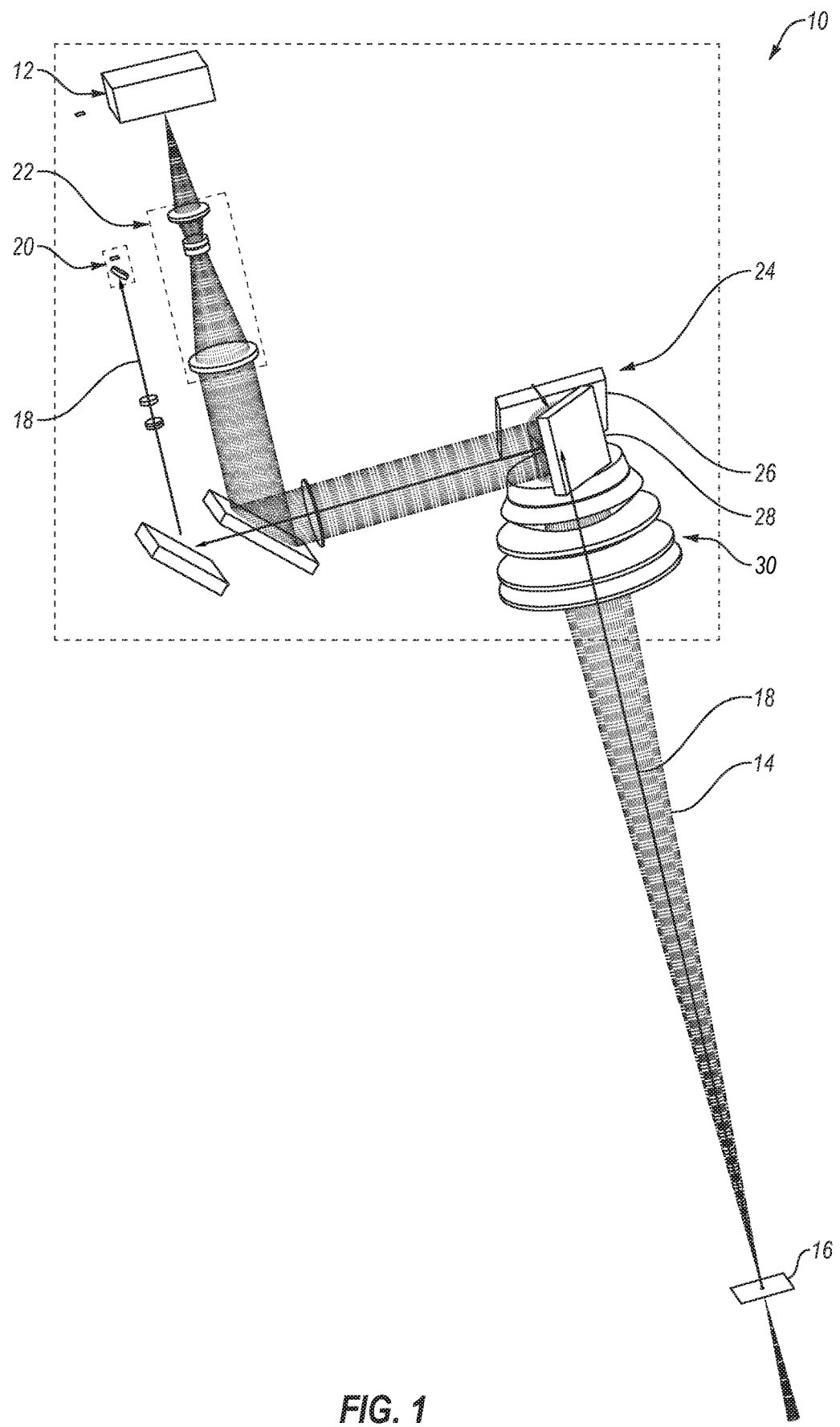
FIG. 1 is a schematic illustration of an optical system relative to a workpiece.

An optical system 10 is schematically illustrated in FIG. 1 and includes a laser source 12 or an optical fiber configured to provide a laser beam 14 which may be directed to a workpiece or component 16. The optical system 10 may be a part of or used in a laser welding head, or in systems for laser cutting or laser machining a component amongst other possibilities. In the context of laser welding for example, the welding head may be a component of a remote welding system which may also include a scanner optical system 24 structured to generate a weld path along a seam between two or more components and control movement of the laser beam 14 along the weld path. In connection with the optical system 10 for example, a sensor beam 18 may move along a sensor beam path in a direction from the component 16 to a camera or sensor 20 which receives the sensor beam 18 for use in generating the weld path. The weld path may also be generated by superposition of a robot path and motion of the scanner. The welding head including the optical system 10 may alternatively be a component of a fixed optic welding system where the welding head is mounted to a component such as a robot or gantry configured to move the welding head relative to the components being joined.

In the optical system 10, the laser beam 14 is provided by a fiber which is representing the laser source 12 and passes through the optical system 10 until it is ultimately directed to the component 16. In instances where the laser beam 14 is used during a joining process, such as a welding process, between two or more components, the component 16 may represent a weld path along a seam between the two or more components. The optical system 10 includes a collimator 22 through which the laser beam 14 passes, and may include a number of components such as lenses or mirrors positioned between the laser source 12 and the location where the laser beam 14 exits the optical system 10 to guide or otherwise manipulate the laser beam 14. In one form, the optical system 10 may include a fiber cable from which the laser beam 14 exits as a beam cone or in a cone shape before entering the collimator 22. The laser beam 14 is collimated or, stated alternatively, becomes mostly parallel exiting the collimator 22 and is directed to a scanner 24 including components 26 and 28 which may be used to direct or move the laser beam 14 along a weld path determined by information detected by the sensor 20. An objective lens 30 is positioned behind the scanner 24 along the beam path of the laser beam 14 and the laser beam is passed from the scanner 24 through the objective lens 30 to the component 16.

Figure 2:
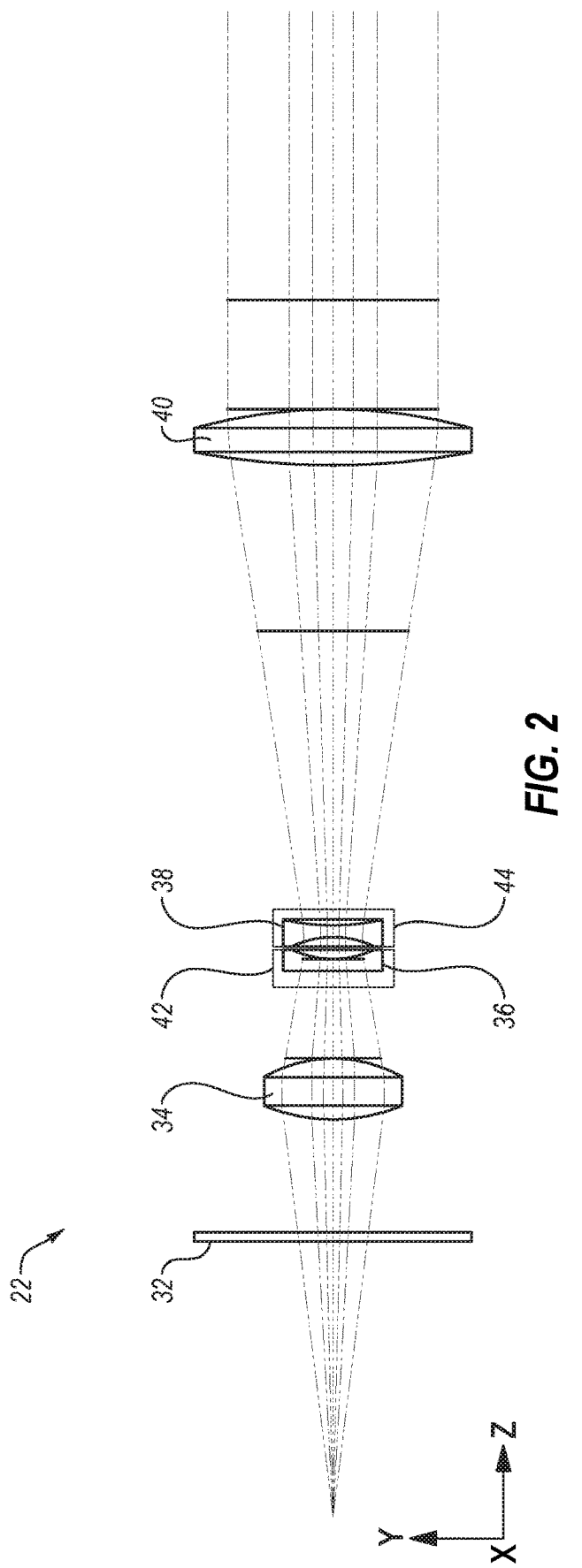
FIG. 2 is a schematic illustration of a collimator of the optical system of FIG. 1.

The optical system 10 is configured to induce a wobble into the laser beam 14 such that the laser beam is moved or oscillated relative to the component 16, further details of which will be provided below in connection with FIG. 3. In one form, the collimator 22, illustrated in greater detail in FIG. 2, may be used to induce the wobble into the laser beam 14. The collimator 22 includes a protective glass 32, a first lens 34, a second lens 36, a third lens 38, and a fourth lens 40. As the laser beam 14 enters the collimator 22, it first passes through the first lens 34, then passes through the second lens 36, then passes through the third lens 38, and then passes through the fourth lens 40 as it exits the collimator 22. In one form, the first lens 34 may be a positive lens and the second lens 36 and the third lens 38 may be negative lenses.

In one form for example, the second lens 36 may have a higher refractive power than that of the other lenses 34, 38 and 40 of the collimator 22, and may also have a higher refractive power than that of other lenses which may be present in the optical system 10. Additionally or alternatively, the third lens 38 may have a higher refractive power than that of the other lenses 34, 36 and 40 of the collimator 22, and may also have a higher refractive power than that of other lenses which may be present in the optical system 10. In some forms, the second lens 36 and the third lens 38 may have the same or substantially same refractive power and their refractive power is greater than that of the other lenses 34 and 40 of the collimator 22, and may also have a higher refractive power than that of the other lenses which may be present in the optical system 10.

The laser beam 14 is directed from the first lens 34 through the second lens 36 and the third lens 38. The collimator 22, which may be a zoom collimator for example, is structured such that the laser beam 14 at the second lens 36 includes a reduced diameter relative to the diameter of the laser beam 14 exiting the collimator 22 after the fourth lens 40. In one form, the first lens 34 reduces the diameter of the laser beam 14 passing therethrough or, stated alternatively, produces a convergence of the laser beam 14. In the illustrated form, the diameter of the second lens 36 and the diameter of the third lens 38 is the same, although forms where the diameter of the second lens 36 and the third lens 38 is different are contemplated. The diameter of the second lens 36 and the diameter of the third lens 38 is less than the diameter of the first lens 34 and the diameter of the fourth lens 40. In addition, the diameter of the first lens 34 is less than the diameter of the fourth lens 40. The laser beam 14 exits the third lens 38 and enters the fourth lens 40, and the diameter of the laser beam 14 as it enters the fourth lens 40 is greater than the diameter of the laser beam 14 exiting the third lens 38. Similarly, the second lens 36 and the third lens 38 may increase the diameter of the laser beam 14 passing through or, stated alternatively, produce a divergence of the laser beam 14.

The first lens 34 and the fourth lens 40 may be considered stationary lenses; i.e., they do not move relative to the beam path of the laser beam 14. The second lens 36 is transversely, or more specifically perpendicularly, movable relative to the beam path of the laser beam 14 along a first axis X which, in FIG. 2, extends perpendicularly to the view plane of the drawing. In one form, for example, the second lens 36, which is optionally positioned in a housing 42, which is movable by a piezo actuator or the second lens 36 may be positioned in flexure bearings and moved by voice coils. The third lens 38 is transversely, or more specifically perpendicularly, movable relative to the beam path of the laser beam 14 along a second axis Y which, in FIG. 2, extends parallel to the view plane of the drawing. In one form, for example, the third lens 38 is positioned in a housing 44 which is movable by a piezo actuator or the third lens 38 may be positioned in flexure bearings and moved by voice coils. While not specifically mentioned previously, the second lens 36 and the thirds lens 38 may be moved transversely, and more specifically perpendicularly, relative to one another. Additionally, or alternatively, in some forms both the second and third lenses 36 and 38 may be moved independently but in the same direction to achieve a larger amplitude of wobbling in the laser beam 14. However, forms where the second and third lenses 36 and 38 are mechanically coupled and moved together in the same direction in the XY plane are also possible.

As indicated above, the collimator 22 may be used to induce a wobble into the laser beam 14. More particularly, as one or both of the second lens 36 and the third lens 38 is moved relative to the laser beam 14, a wobble is introduced into the laser beam 14 which results in movement of the laser beam 14 relative to the component 16 independent of movement of the laser beam 14 by movement of the welding head relative to component 16, movement of the laser beam 14 by the scanner 24, movement of the component 16 relative to the welding held, or any combination of these movements. The wobble or movement of the laser beam 14 may be seen in FIG. 3 where a schematic illustration of a welding process for joining a first component 16a and a second component 16b is provided. In FIG. 3, a welding head including the optical system 10 may be moved in the direction of arrow 46 along a joint 48 between the components 16a and 16b. In other forms, the laser beam 14 may be moved by the scanner 24 in the direction of arrow 46 while the welding head and the components 16a and 16b remain stationary, or the components 16a and 16b could be moved in a direction opposite of the arrow 46 while the welding head and the laser beam 14 remain stationary such that the laser beam 14 passes over the components 16a and 16b in the direction of arrow 46. Forms in which a combination of two or more of these actions is utilized to effect movement of the laser beam 14 and the components 16a and 16b relative to one another to facilitate joining of the components 16a and 16b along the joint 48 are also contemplated.

As the welding head is moved in the direction of arrow 46, the laser beam 14 is also moved in the direction of arrow 46. However, due to wobbling induced into the laser beam 14 by the collimator 22, the laser beam is also moved back and forth between opposite sides of a weld path 50 such that the area in the weld path 50 covered by the laser beam 14 is greater than the diameter of the laser beam 14. The movement may be, but is not limited to, a sinusoidal pattern. This effect may be seen in the welded portion or seam 52 in FIG. 3. The amplitude of the laser beam 14 wobbling or movement relative to the components 16a and 16b may be determined by the extent to which the second lens 36, the third lens 38, or both are moved. For example, if a smaller distance between opposite sides of the weld path 50 (i.e., a narrower weld path 50) is desired, then the movement of the second lens 36, the third lens 38, or both may be reduced to reduce the wobble amplitude. Alternatively, if a larger distance between opposite sides of the weld path 50 (i.e., a wider weld path 50) is desired, then the movement of the second lens 36, the third lens 38, or both may be increased to increase the wobble amplitude.

Figure 3:
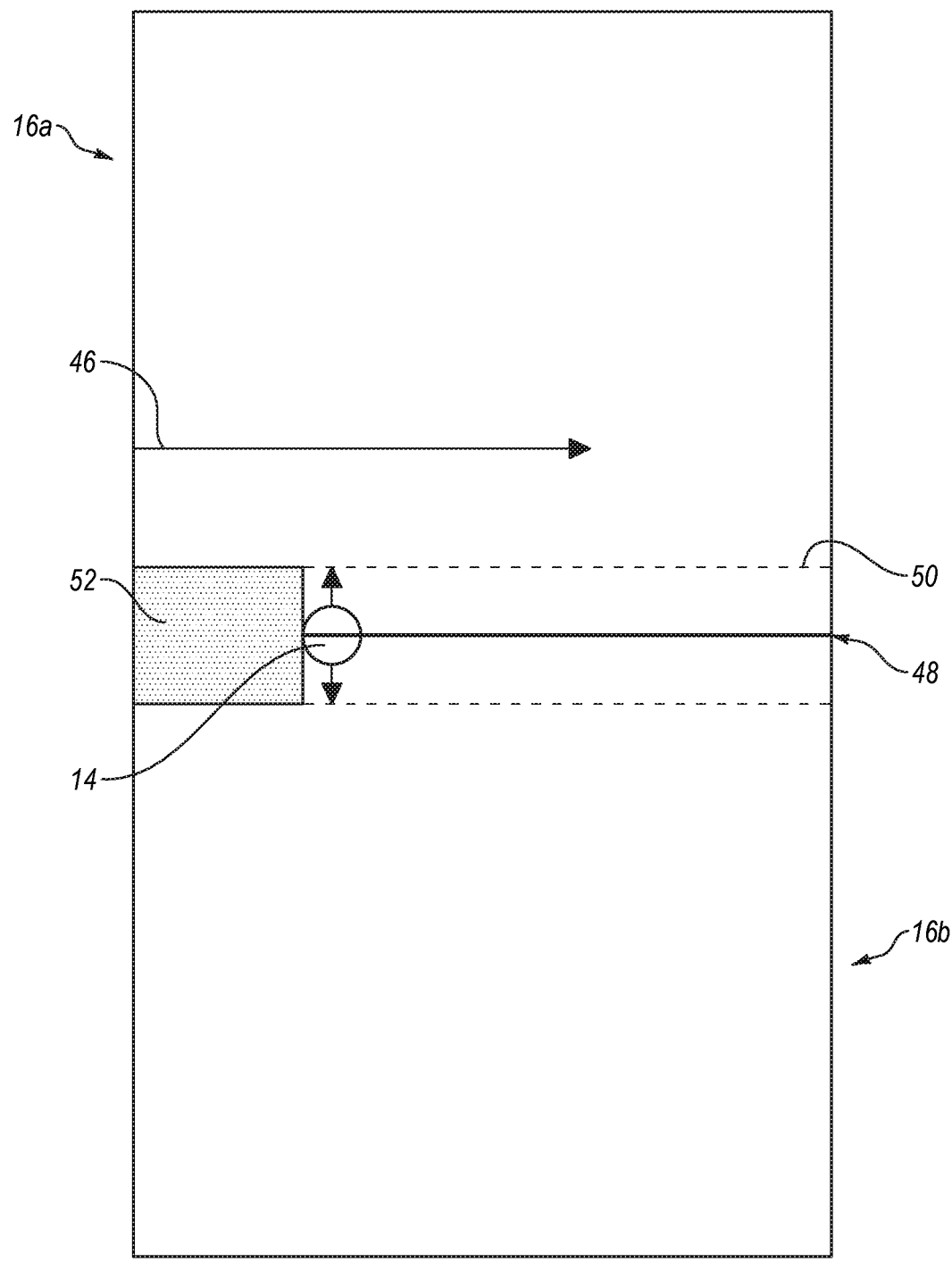
FIG. 3 is a schematic illustration of a laser beam path produced by the optical system of FIG. 1 relative to a seam between two components.

The illustration of FIG. 3 is representative of wobbling of the laser beam 14 induced by movement of one of the second lens 36, the third lens 38, or the both the second lens 36 and the third lens 38 in the same direction such that the movement of the laser beam 14 resulting from lens movement in the collimator 22 relative to the components 16a and 16b is in a single plane. In this regard, it should be appreciated that movement of the second lens 36, the third lens 38, or both the second lens 36 and the third lens 38 may be determined based on the relative geometry or orientation of the components 16a and 16b being joined together in order to move the laser beam 14 in a relevant plane or planes relative to the particular geometry or orientation of the components 16a and 16b. For example, if the wobble is being induced by movement of the second lens 36 and the geometry or orientation of the components 16a and 16b changes, then the third lens 38 may be moved in addition to or in lieu of moving the second lens 36 to account for the geometry or orientation change. In some forms, the second lens 36 and the third lens 38 could be replaced by a single, functionally similar lens that may be moved along both the X and Y axes. Still, in other forms, only one of the second lens 36 and the third lens 38 may be included in the collimator 22, and the laser beam 14 may only be moved or wobbled in a single plane relative to the components 16a and 16b by moving the remaining lens.

While not previously discussed, it should be appreciated that the high refractive power of the second lens 36 and the third lens 38 and thus the reduced diameter of the laser beam 14 which passes through the second lens 36 and the third lens 38 facilitates smaller movements of the second lens 36, the third lens 38, or both in order to induce the desired wobbling into the laser beam 14 relative to forms where the seconds lens 36 and the third lens 38 do not have high refractive power resulting in the laser beam 14 with a reduction in its diameter. In this regard, a small movement of the second lens 36 or the third lens 38 leads to a significantly larger movement of the laser beam 14 at a downstream location such as where the laser beam 14 interacts with the component 16. Generally speaking, this configuration results in an "optical lever" which reduces the required movement of the second lens 36 or the third lens 38 necessary to achieve the desired movement of the laser beam 14. As a result, accelerations associated with movement of the second lens 36 or the third lens 38 necessary to induce wobbling are decreased along with vibration recoil on the optical system 10 associated with the accelerations. Moreover, since the diameter of the second lens 36 and the diameter of the third lens 38 may be reduced given the reduction in the diameter of the laser beam 14, the mass of the seconds lens 36 and the third lens 38 is reduced which also reduces forces on the optical system 10 associated with movement of these lenses.

With reference to FIG. 1 for example, it should be appreciated that the movement or wobbling induced into the laser beam 14 by the collimator 22 avoids superimposing the wobble onto the sensor beam 18. As a corollary, related influence on the sensor 20 which may affect accuracy in determination of a weld path may be avoided. More specifically, in the optical system 10, the wobbling movement of the laser beam 14 by the collimator 22 occurs upstream along the beam path of the laser beam 14 of the location where the paths of the laser beam 14 and the sensor beam 18 are combined. As such, the sensor beam 18 is not moved in connection with movement of the laser beam 14. Without being limited to any particular configuration, and to provide description of one example which may provide the effects discussed above, an example system for inducing a wobble into the laser beam 14 includes a collimator 22 having a focal length of 150 mm, a focusing lens having a focal length of 450 mm, and a laser beam 14 having a 37.5 mm raw diameter exiting the collimator 22. The magnification of the system is −3, and the lenses 36 and 38 have an 18 mm diameter while the laser beam passing through these lenses has a 12 mm diameter. The lenses 36 and 38 have focal lengths of −30 mm and −33 mm, respectively. At a magnification of −3, the motion of the second lens 36 and the third lens 38 together will result in an 8× magnified motion of the laser beam 14 on a workpiece. Similarly, for a spot movement of the laser beam 14 with an amplitude of 0.4 mm (400 µm) (corresponding to ≥1 mm track width), the second lens 36 and the third lens 38 together only have to be moved by 50 µm. A sinusoidal motion of 50 µm amplitude (100 µm turning-point to turning point) at 200 cycles results in an acceleration of 79 m/(s^2) or 8 g.

What is claimed is:

1. A system, comprising:
a laser source for providing a laser beam along a laser beam path; and
a sensor that receives a sensor beam along a sensor beam path and detects a weld path;
a scanner that directs the laser beam toward the weld path detected by the sensor and directs a laser spot generated by the laser beam along the weld path detected by the sensor; and
a collimator, positioned along the laser beam path outside the sensor beam path, including at least one negative lens that is transversely movable perpendicular to the laser beam path to oscillate the laser beam and cause the laser spot to form a sinusoidal pattern along the weld path;
wherein the collimator is structured such that the laser beam at the at least one negative lens has a reduced diameter relative to a diameter of the laser beam exiting the collimator.

2. The system of claim 1, wherein the at least one negative lens is movable in a two-dimensional plane extending perpendicular to the laser beam path.

3. The system of claim 1, wherein at least two lenses of the collimator are negative and are transversely movable relative to the laser beam path to cause the laser spot generated by the laser beam to form the sinusoidal pattern along the weld path.

4. The system of claim 3, wherein the at least two lenses are positioned adjacent to one another, mechanically coupled, and movable together in a two-dimensional plane extending perpendicular to the laser beam path.

5. The system of claim 3, wherein the at least two lenses are positioned adjacent to one another and are independently movable relative to one another.

6. The system of claim 5, wherein the at least two lenses are transversely movable relative to one another.

7. A system, comprising:
a laser source for providing a laser beam along a laser beam path; and
a sensor that receives a sensor beam along a sensor beam path and detects a weld path;
a scanner that directs the laser beam toward the weld path detected by the sensor and directs a laser spot generated by the laser beam along the weld path detected by the sensor; and
a collimator including a plurality of lenses positioned along the laser beam path outside the sensor beam path, wherein the plurality of lenses includes one or more movable negative lenses transversely movable relative to the laser beam path to oscillate the laser beam and cause the laser spot to form a sinusoidal pattern along the weld path,
wherein each of the one or more movable negative lenses includes a refractive power that is greater than the refractive power of other lenses of the plurality of lenses of the collimator.

8. The system of claim 7, wherein each of the one or more movable negative lenses is movable in a two-dimensional plane extending perpendicular to the laser beam path.

9. The system of claim 7, wherein the one or more movable negative lenses includes two or more movable negative lenses transversely movable relative to the laser beam path to oscillate the laser beam and cause the laser spot generated by the laser beam to form the sinusoidal pattern along the weld path.

10. The system of claim 9, wherein the two or more movable negative lenses include a pair of negative lenses positioned adjacent to one another, mechanically coupled, and movable together in a two-dimensional plane extending perpendicular to the laser beam path.

11. The system of claim 9, wherein the two or more movable negative lenses include a pair of negative lenses positioned adjacent to one another and independently movable relative to one another.

12. The system of claim 11, wherein the two or more movable negative lenses are transversely movable relative to one another.

13. The system of claim 7, wherein one of the movable negative lenses is positioned in a movable housing.

14. The system of claim 1, wherein:
the sensor is further configured to detect a laser cutting path or a laser machining path;
the scanner is configured to direct the laser beam along the laser cutting path or the laser machining path; and
the transverse movement of the at least one negative lens oscillates the laser spot in a direction perpendicular or oblique to the laser cutting path or the laser machining path.

15. The system of claim 1, wherein the sensor beam avoids superimposition of the sinusoidal pattern.

16. The system of claim 1, wherein the collimator is positioned to oscillate the laser beam without oscillating the sensor beam.

17. The system of claim 1, wherein the oscillation of the laser beam produces a laser spot path having a width greater than a diameter of the laser beam.

18. The system of claim 1, wherein the collimator oscillates the laser beam upstream of a location along the laser beam path where the laser beam path is superimposed over the sensor beam path.

19. The system of claim 7, wherein the collimator oscillates the laser beam upstream of a location along the laser beam path where the laser beam path is superimposed over the sensor beam path.

* * * * *